US007884982B2

(12) United States Patent
Nakayama et al.

(10) Patent No.: US 7,884,982 B2
(45) Date of Patent: Feb. 8, 2011

(54) IMAGING APPARATUS AND IMAGE DATA CONVERSION METHOD

(75) Inventors: Masaaki Nakayama, Hirakata (JP); Kenji Maeda, Takatsuki (JP)

(73) Assignee: Panasonic Corporation, Osaka (JP)

( * ) Notice: Subject to any disclaimer, the term of this patent is extended or adjusted under 35 U.S.C. 154(b) by 1144 days.

(21) Appl. No.: 11/081,157

(22) Filed: Mar. 16, 2005

(65) Prior Publication Data

US 2005/0206965 A1 Sep. 22, 2005

(30) Foreign Application Priority Data

Mar. 16, 2004 (JP) ............................. 2004-074257

(51) Int. Cl.
*G06K 15/00* (2006.01)
*H04N 1/46* (2006.01)
(52) U.S. Cl. ..................... 358/540; 358/1.16; 358/1.17; 358/1.18; 358/538
(58) Field of Classification Search ................ 358/516, 358/1.9, 450, 453, 515, 518, 519, 520, 521, 358/538, 540, 1.16, 1.17, 1.18; 348/223.1, 348/665, 655
See application file for complete search history.

(56) References Cited

U.S. PATENT DOCUMENTS 5,528,373 A * 6/1996 Shinomiya ............... 348/224.1

| 6,701,011 | B1 * | 3/2004 | Nakajima | 382/167 |
|---|---|---|---|---|
| 6,791,606 | B1 * | 9/2004 | Miyano | 348/223.1 |
| 7,423,675 | B2 * | 9/2008 | Takahashi | 348/231.99 |
| 2003/0011686 | A1 * | 1/2003 | Higuchi | 348/223.1 |
| 2003/0025822 | A1 * | 2/2003 | Shimada | 348/370 |
| 2003/0193602 | A1 * | 10/2003 | Satoh et al. | 348/333.12 |
| 2004/0001156 | A1 * | 1/2004 | Kazami et al. | 348/231.3 |

FOREIGN PATENT DOCUMENTS

JP      1-221994    9/1989
JP      2002-95004  3/2002

* cited by examiner

*Primary Examiner*—James A Thompson
(74) *Attorney, Agent, or Firm*—RatnerPrestia

(57) ABSTRACT

An imaging apparatus capable of performing image conversion such as white balance with a simple operation to obtain image data suited to user's preference, includes an imaging section, an image divider, a calculator, and an image converter. The imaging section images a subject to generate image data. The image divider divides a whole region of the generated image data into plural regions, and outputs first data including data in at least one of the divided regions and second data including data in at least one of other divided regions. The calculator calculates a first set value (for example, for correcting white balance of the image data) based on the first data, and a second set value based on the second data. The image converter generates first converted image data (for example, with corrected white balance) based on the first set value, and generates second converted image data based on the second set value.

16 Claims, 7 Drawing Sheets

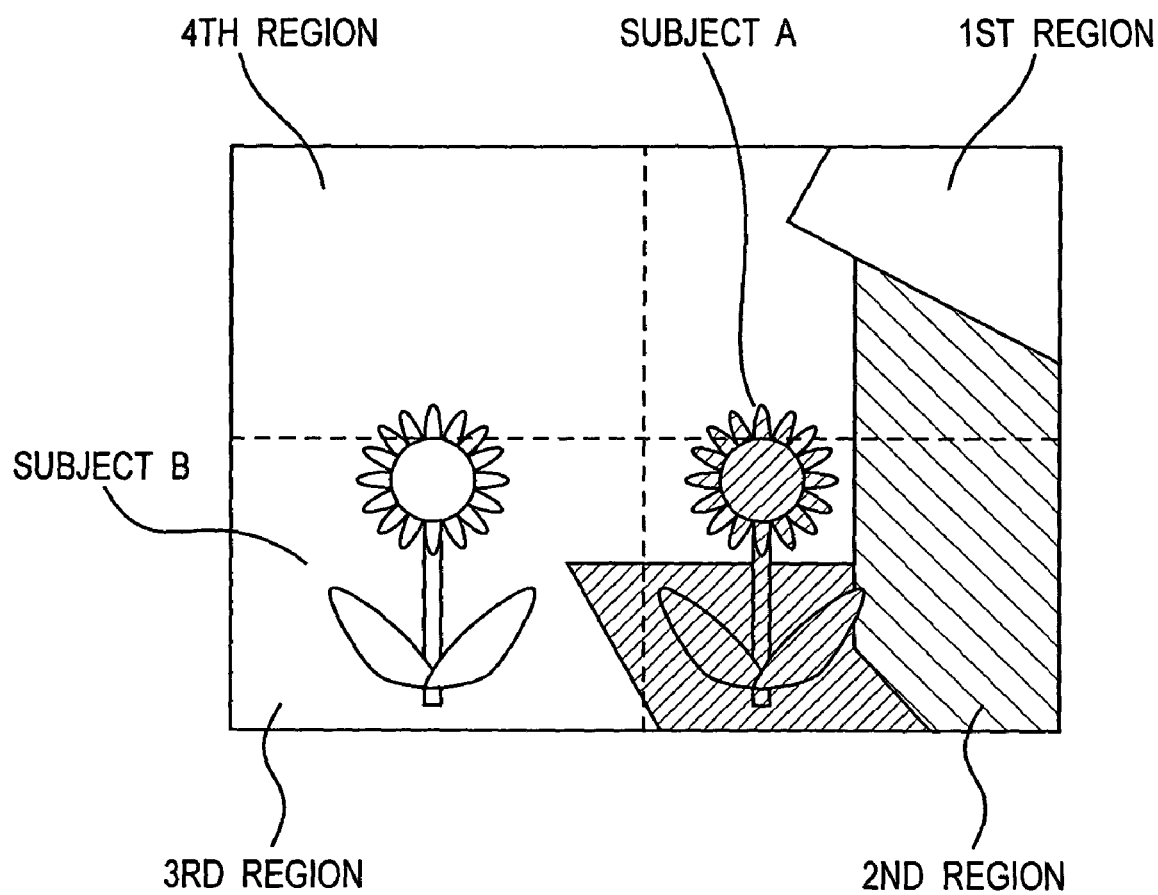

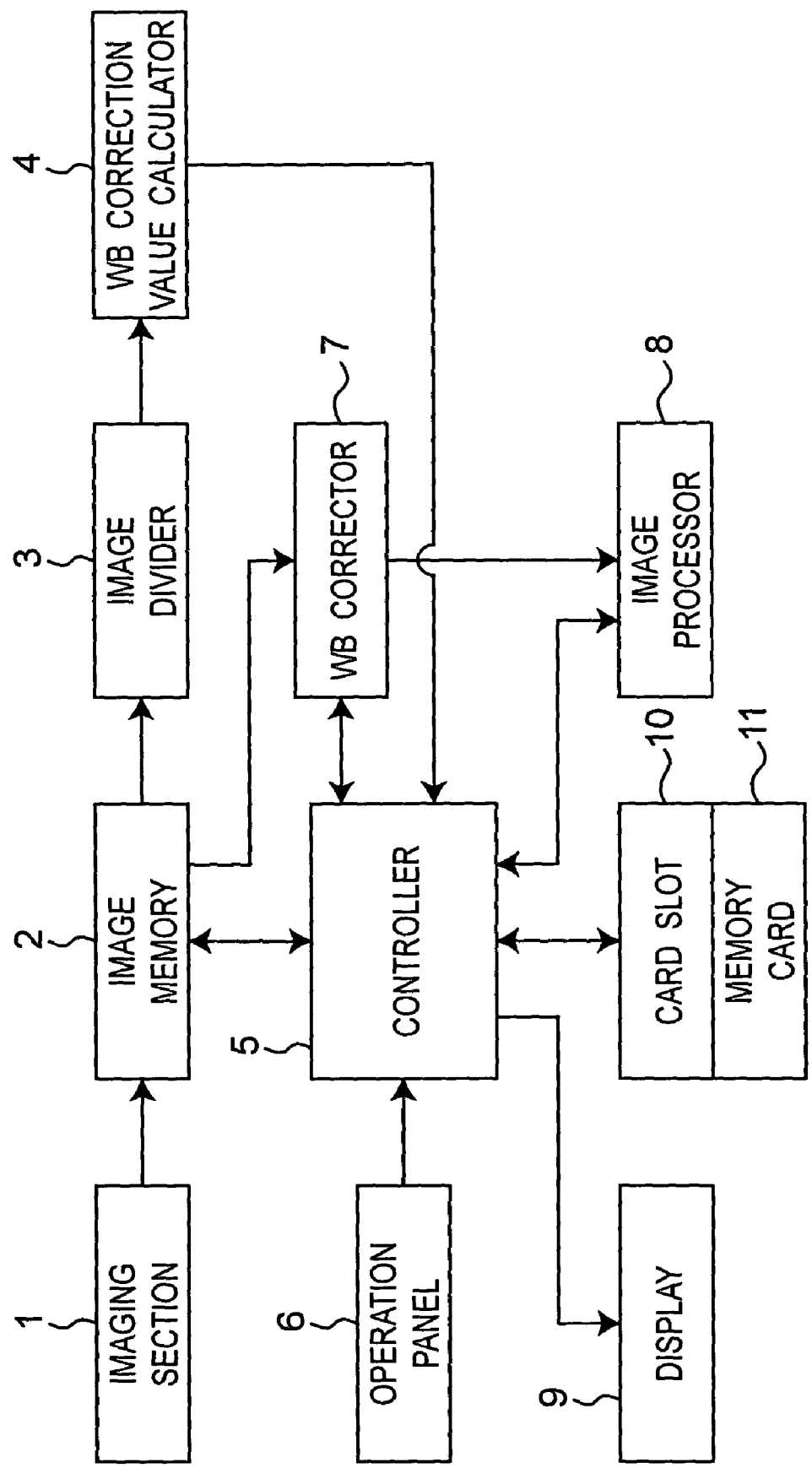

Fig.5A

| WB CORRECTION BASIC VALUE | A | B | C | D | E |
|---|---|---|---|---|---|
| SPECIFIC VALUE | +3.5 | −1.0 | 0 | −1.5 | +0.2 |

Fig.5B

| WB CORRECTION VALUE | 1ST SET VALUE | 2DN SET VALUE | 3RD SET VALUE |
|---|---|---|---|
| SELECTED VALUE | 0 | +0.2 | −1.0 |

Fig.5C

| WB CORRECTION VALUE | 1ST SET VALUE | 2DN SET VALUE | 3RD SET VALUE |
|---|---|---|---|
| SELECTED VALUE | +0.2 | 0 | −1.0 |

Fig.5D

| GROUP | F | G | H | J | K |
|---|---|---|---|---|---|
| RANGE | −5.0~ | −3.0~ | −1.0~ | +1.0~ | +3.0~+5.0 |
| REPRESENTATIVE VALUE | −4.0 | −2.0 | 0 | +2.0 | +4.0 |

↑ 1ST SET VALUE    ↑ 2ND SET VALUE    ↑ 3RD SET VALUE

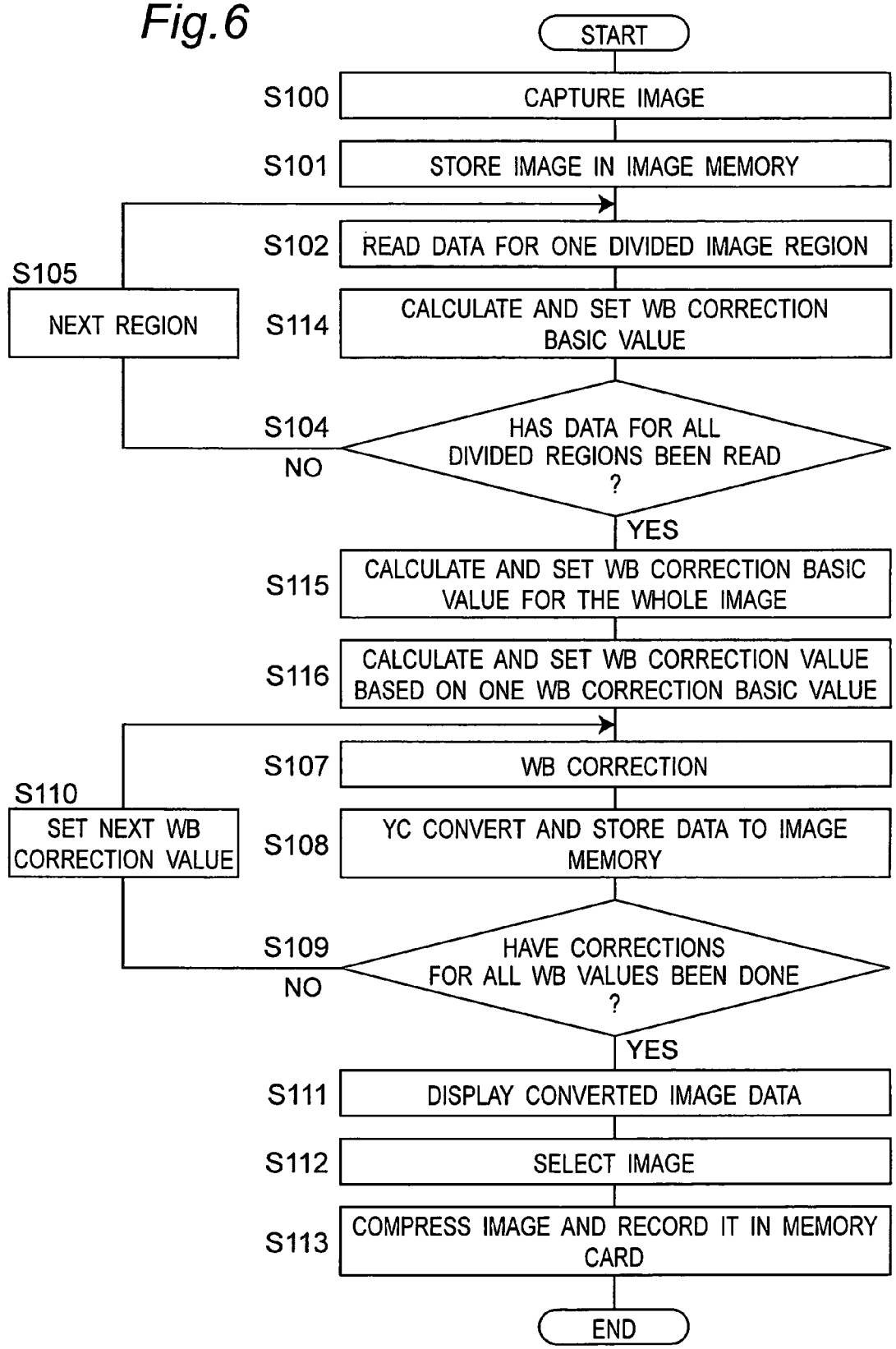

IMAGING APPARATUS AND IMAGE DATA CONVERSION METHOD

BACKGROUND OF THE INVENTION

1. Technical Field

The present invention relates to an imaging apparatus such as digital camera, and more particularly to art of image conversion in an imaging apparatus such as white balance or the like.

2. Related Art

Patent document 1 discloses an electronic still camera capable of selecting a mode of imaging with continuously varying white balance (possibly abbreviated to "WB"). When taking images in this mode, the electronic still camera in patent document 1 can record images plural times while changing the detected color temperature stepwise.

Patent document 2 discloses an electronic camera including an image divider for dividing a whole region of the captured image into plural regions, a white balance detector for determining plural white balance correction values based on the image data in each region, and a white balance calculator for determining one final white balance correction value from the plural white balance correction values, in which white balance of the captured image is corrected based on the final white balance correction value. Thus, the precision of white determination is enhanced, and a favorable white balance is obtained if the subject has no white color.

Patent document 1: JP 01-221994 A

Patent document 2: JP 2002-95004 A

The electronic still camera in patent document 1 is intended to adjust white balance stepwise so as to obtain a predetermined color temperature regardless of the captured image. Hence, the electronic still camera in patent document 1 does not always provide the image having white balance suited to user's preference depending on the tone of the original captured image.

The electronic still camera in patent document 1 takes images plural times, but does not provide a plurality of images each having different white balance to a single captured image. As a result, if white balance is suited to user's preference, the layout of the captured image may not be always suited to user's preference.

The electronic camera in patent document 2 determines the final white balance correction value from plural white balance correction values, and can enhance precision of white color determination. But only one image is corrected by using the final white balance correction value, and thus the finally corrected image may not be always suited to user's preference.

SUMMARY OF THE INVENTION

The present invention is directed to solve the problems of the prior art, and it is hence an object thereof to provide an imaging apparatus and a converting method of image data capable of performing image conversion such as white balance with a simple operation to obtain image data suited to user's preference.

To achieve the object, an imaging apparatus according to the invention includes an imaging section, an image divider, a calculator, and an image converter. Herein, the imaging section images a subject to generate image data. The image divider divides a whole region of the image data generated by the imaging section into plural regions, and output first data including data in at least one of the divided regions and second data including data in at least one of other divided regions. The calculator calculates a first set value based on the first data, and calculates a second set value based on the second data. The image converter converts the image data generated by the imaging section based on the first set value to generate first converted image data, and converts the image data generated by the imaging section based on the second set value to generate second converted image data.

Thus, the imaging apparatus of the invention is configured to generate, based on plural set values, the corresponding converted images, thereby generating images suited to the preference of the user. Since the original image of each converted image is the same one, even if the user converts the image as he/she desired, it is prevented that the layout of the image becomes what the user does not desire.

The calculator may also calculate a third set value based on a whole region of the image data generated by the imaging section, and the image converter may convert the image data generated by the imaging section based on the third set value to generate third converted image data. In this configuration, the converted image using data in a whole region of the image can be added to candidates of final converted image, and the final converted image does not become largely different from user's preference.

A setting section may be further provided, and the calculator may calculate a set basic value becoming the basis for setting in the setting section. In this case, the setting section sets a first set value based on at least one of the calculated set basic values, and sets a second set value based on at least one of other calculated set basic values. Therefore, before selection of converted image by the user, set values can be narrowed down to proper number of values, thus preventing production of multiple undesired converted images.

As the set value or set basic value, for example, values used for correcting white balance of the image may be used.

Further, an image selector may be provided for selecting the first converted image data, second converted image data, or other converted image data. Hence, the user can operate easily for selecting an image.

Further, a controller may be provided for conducting control to store the converted image data selected by the image selector or compressed data of the converted image data selected in a recording medium. Hence, only the converted images needed by the user can be stored in the recording medium, and waste of memory capacity of the recording medium can be prevented.

An image data conversion method according to the invention includes imaging a subject to generate image data, dividing a whole region of the generated image data into plural regions and outputting first data including data in at least one of the divided regions and second data including data in at least one of other divided regions, calculating a first set value based on the first data, calculating a second set value based on the second data, converting the generated image data based on the first set value to generate first converted image data, and converting the generated image data based on the second set value to generate second converted image data.

According to the present invention, provided is an effect that image conversion such as white balance can be executed with a simple operation so as to obtain image data suited to user's preference.

BRIEF DESCRIPTION OF THE DRAWINGS

FIG. 1 is a schematic diagram of an image taken or captured by a digital camera according to first and second embodiments of the invention.

FIG. 2 is a block diagram of configuration of the digital camera according to the first embodiment of the invention.

FIGS. 5A to 5D are diagrams for explaining setting methods of setting with an operation panel of the digital camera according to the second embodiment of the invention.

FIG. 6 is a flowchart of an operation of the digital camera according to the second embodiment of the invention.

DETAIL DESCRIPTION OF THE PREFERRED EMBODIMENTS

Figure 3A:
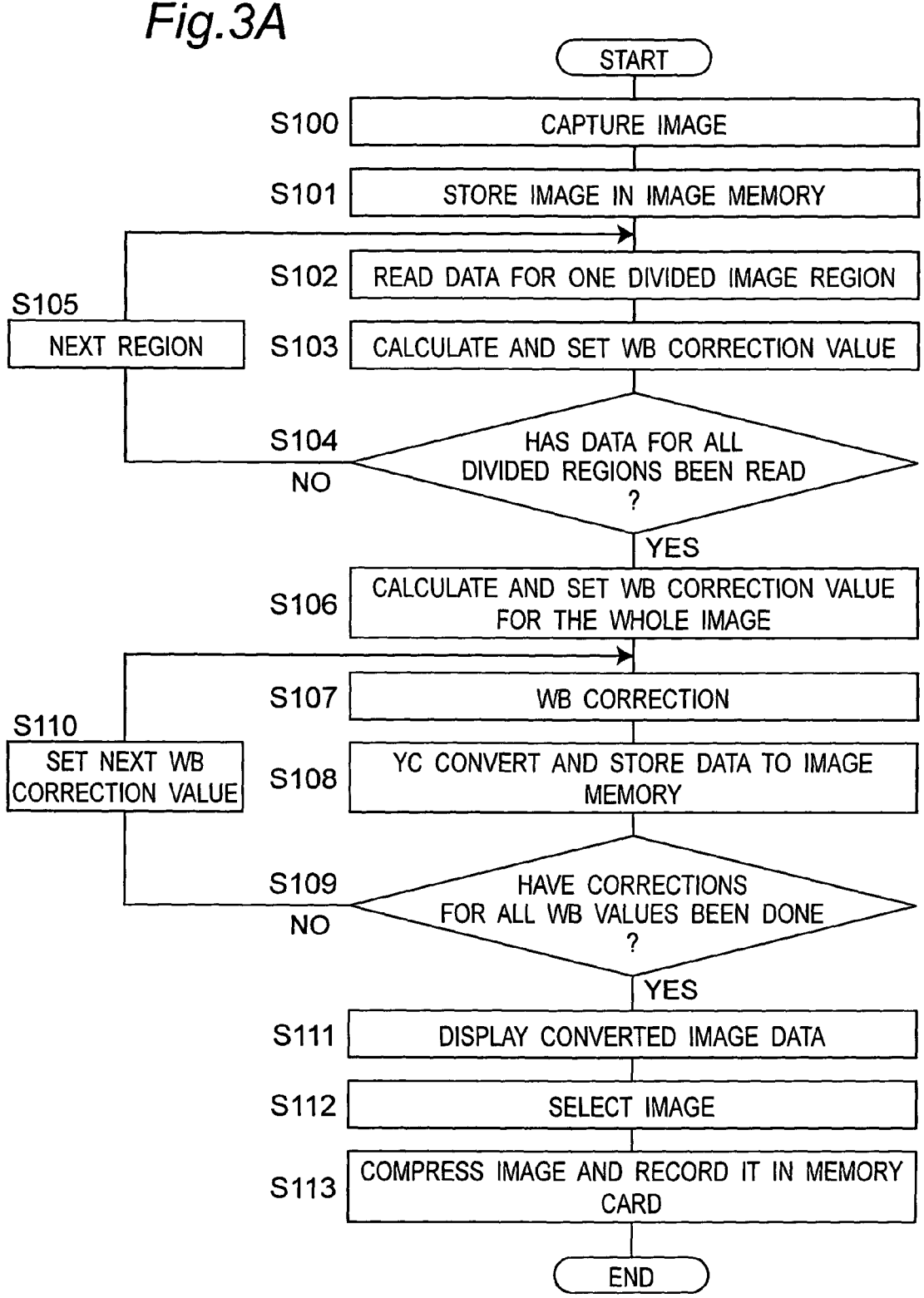
FIG. 3A is a flowchart of operation of the digital camera according to the first embodiment of the invention.

Preferred embodiments of the invention are described below with reference to FIGS. 1 to 6.

First Embodiment

First embodiment of the invention is explained with reference to FIGS. 1 to 3.

1.1 Outline of Digital Camera in First Embodiment

The digital camera in the first embodiment of the invention divides a whole region of an image which is imaged or captured (for example, the image shown in FIG. 1) into plural regions, and calculates white balance (WB) correction values in order to set the optimum white balance in each region. That is, the digital camera in the first embodiment calculates the WB correction values based on the respective image data in the first to fourth regions.

After calculating the WB correction value in each region, the WB correction value is calculated based on the whole image. Based on these WB correction values, the captured image data is corrected. Therefore, the digital camera in the first embodiment of the invention generates a plurality of (five in the case of FIG. 1) images with differing WB, for the same captured image.

Accordingly, the user can select and store desired one from the plural image data after WB correction.

1.2 Configuration of Digital Camera in the First Embodiment

FIG. 2 shows a configuration of the digital camera in the first embodiment of the invention. An imaging section 1 is composed of optical parts such as lens, imaging devices such as CCD and CMOS sensors, A/D converter, and others. The imaging section 1 images a subject (or captures an image of a subject) to generate the image data. The image data generated in the imaging section 1 is RAW data.

An image memory 2 is storage means composed of DRAM, flash memory, etc. The image memory 2 is storage means for temporarily storing the image data generated in the imaging section 1. The image memory 2 also stores the YC data YC converted in an image processor 8.

An image divider 3 divides a whole region of image data generated in the imaging section 1 into plural regions. The image divider 3 reads out image data sequentially from each region, and outputs the data to a WB correction value calculator 4. More specifically, the whole image as shown in FIG. 1 is divided into four regions, and the image data is read out sequentially from the first region to transfer it to the WB correction value calculator 4.

The WB correction value calculator 4 calculates the WB correction value based on the image data entered from the image divider 3. It is noted that the WB correction value is a set value for reproducing an original white color in a portion in which the original white color is not included in the captured image data due to a light source or the like. The WB correction value is stored in a controller 5, and is utilized by a WB corrector 7 to optimize white balance of the image data imaged by the imaging section 1.

The controller 5 is means for controlling the entire digital camera, for example, controlling the image memory 2, the WB corrector 7, an image processor 8, a display 9, and a card slot 10.

An operation panel 6 includes operation buttons and others provided on a case of the digital camera. The user manipulates the operation panel 6 to transmit user's intention to the controller 5, thereby setting conditions for imaging and other conditions of the digital camera.

The WB corrector 7 corrects the WB of the image data stored in the image memory 2, and generates image data after WB correction. At this time, the WB corrector 7 is preliminarily provided with WB control value by the controller 5 before starting WB correction operation.

The image processor 8 subjects the image data after WB correction to YC conversion. The image processor 8 compresses the YC data stored in the image memory 2, or expands the compressed data stored in a memory card 11. The image processor 8 also conducts other image processing such as resolution conversion.

The display 9 is display means including liquid crystal display or organic EL display. The display 9 shows the image imaged by the imaging section 1 or setting of digital camera.

The card slot 10 is provided for detachably loading the memory card 11. The card slot 10 controls the loaded memory card 11 for reading and writing data. The memory card 11 includes a flash memory or the like, and stores the image data generated in the imaging section 1.

The image divider 3, WB correction value calculator 4, controller 5, and WB corrector 7 may be composed of either hardware such as semiconductor circuit, or software. They may be also composed of a combination of a semiconductor circuit and software mounted thereon. The software may be stored in the semiconductor memory such as RCM or flash memory. The semiconductor circuit and software may be formed on a same semiconductor chip. Further, the image divider 3, WB correction value calculator 4, controller 5, and WB corrector 7 may be either formed on different semiconductor chips, or formed on the same semiconductor chip.

The WB correction value calculator 4 is an example of calculating means of the invention. The structure including the operation panel 6, the controller 5 and the display 9 is shown as one example of image selecting means of the invention. The WB corrector 7 is an example of image converting means of the invention. The memory card 11 is an example of storage medium of the invention. WB correction is an example of image conversion of the invention. WB correction value is an example of set value of the invention.

1.3 Operation of Digital Camera in First Embodiment

Operation of the digital camera is explained by referring to FIG. 3A. More specifically, the explanation is made to operation of the digital camera including taking the subject shown in FIG. 1, correcting WB of the captured image, and storing the image data after WB correction to the memory card 11.

Focusing on subjects A and B shown in FIG. 1, when the user presses the shutter button (not shown) of the digital camera, the imaging section 1 generates image data (this image data is RAW data) to send it to the image memory 2 (S100). The image memory 2 temporarily stores the entered image data (S101).

The image divider 3 then reads out the image data in the first region shown in FIG. 1 from the image memory 2 to output it to the WB correction value calculator 4 (S102). The WB correction value calculator 4 calculates the WB correction value based on the entered image data (hereinafter, the WB correction value on the first region is called "WB correction value A", the one on the second region is called "WB correction value B", the one on the third region is called "WB correction value C", the one on the fourth region is called "WB correction value D", and the one for the whole image region is called "WB correction value E"). The calculated WB correction value a is issued to the controller 5, and the controller 5 stores the value in the internal memory temporarily.

The controller 5 then checks if the image divider 3 has read out image data of all divided regions from the image memory 2 (S104). As a result, since only the first region has been read out and all divided regions shown in FIG. 1 are not read out yet, it is judged "No" at step S104, and the process goes to step S105. At step S105, the controller 5 transfers the object of processing to next region, that is, the second region. As in the case of the processing in the first region, the second region is processed according to steps S102 to S104.

In this manner, the controller 5 calculates the WB correction value for each of first to fourth regions, and stores four WB correction values of WB correction values A to D as set values. When the image divider 3 reads out the image data of all divided regions, the controller 5 judges "Yes" at step S104, and the process transfers to step S106.

Then, the controller 5 calculates WB correction value E about the whole region of the image data shown in FIG. 1 based on WB correction values A to D (S106). In the first embodiment of the invention, the WB correction value E is calculated based on the WB correction values A to D, however the WB correction value calculator 4 may be designed to read out the image data of the portion of one screen newly from the image memory 2 and calculate the WB correction value E.

The controller 5 outputs the WB correction value A determined based on the first region to the WB corrector 7. The WB corrector 7 reads out the whole image data stored in the image memory 2, and corrects white balance of the whole image data based on the WB correction value A (S107). The image data after WB correction (hereinafter, the image data corrected based on WB correction value A is called "converted image data A") is put into the image processor 8, and is subjected to YC conversion. Similarly, the one corrected based on WB correction value B is called "converted image data B", the one corrected based on WB correction value C is called "converted image data C", the one corrected based on WB correction value D is called "converted image data D", and the one corrected based on WB correction value E is called "converted image data E". The YC converted image data is put into the memory 2 by way of the controller 5 or a system bus to be stored in the image memory 2 (S108).

Further, the controller 5 judges whether the WB corrector 7 has corrected the image data based on all WB correction values (S109). As a result, the WB corrector 7 judges "No" at step S109 because the image data has been corrected only based on WB correction value A, and the next WB correction value, that is, WB correction value B, is sent to the WB corrector 7. Thereafter, as for WB correction values B to E, the operation in steps S107 to 109 is repeated same as in the case of WB correction value A.

Hence, the image memory 2 stores image data of five converted images A to E (data for these image is YC data). Each converted image data has a different WB. For example, in the converted image B, white balance is corrected based on the WB correction value B which is obtained from the image data of the second region including lots of shadow portions of building such as subject A, and thus the converted image data B is image data which is corrected entirely for white balance so that the white color of the second region may be original white color. By contrast, in the converted image C, white balance is corrected based on the WB correction value C which is obtained from image data of the third region including lots of portions to which a natural light directly incidents and hardly have shadow, such as subject B, and thus the converted image C is image data which is corrected entirely for white balance so that the white color of the third region may be original white color.

The user can select a desired image from converted images A to E by the operation of steps S111 to S113.

Figure 3B:
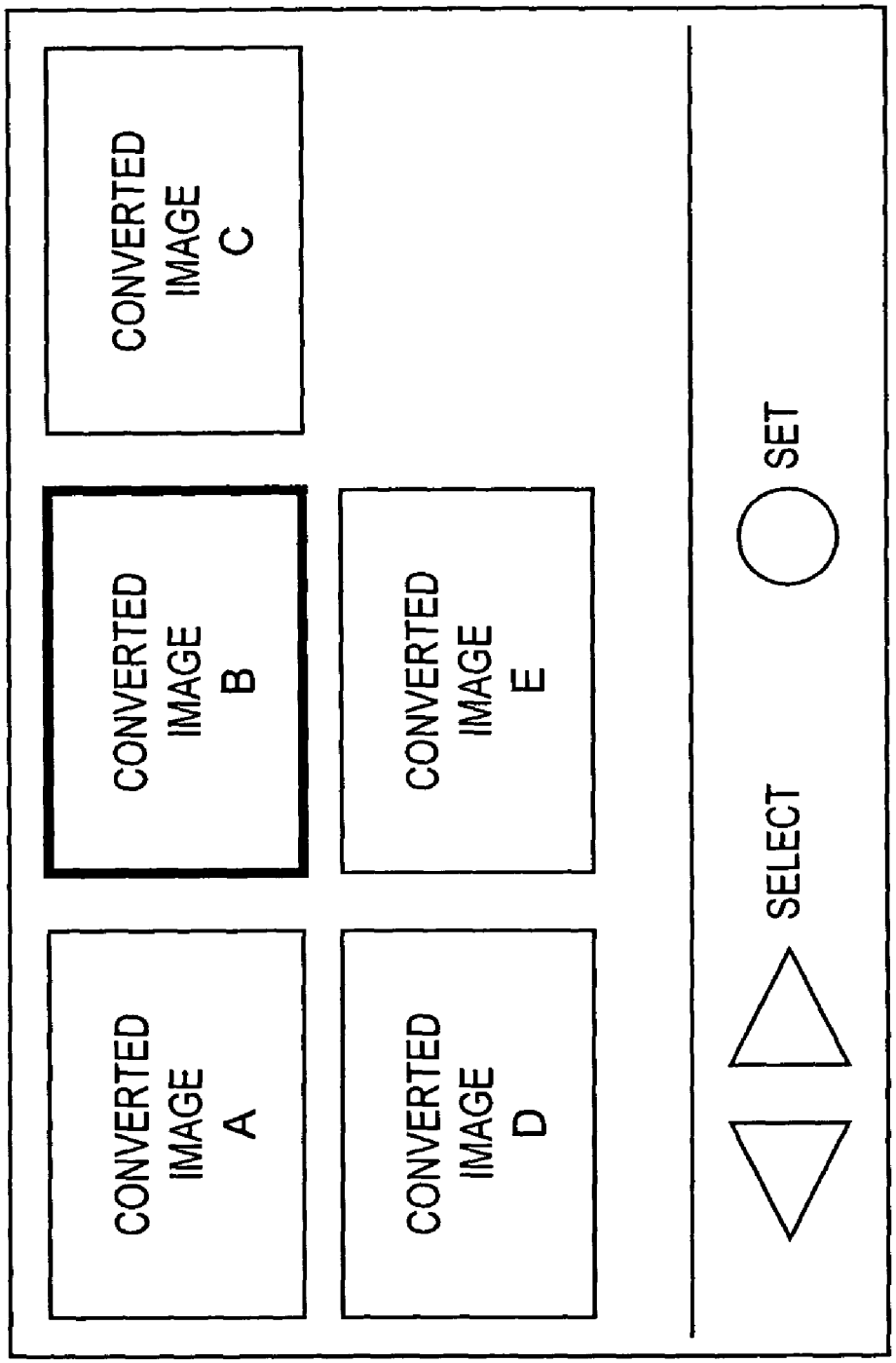
FIG. 3B is a diagram of display as an example for selection of an image with white balance corrected according to the first embodiment of the invention.

That is, the controller 5 reads out converted images A to E from the image memory 2, and displays on the display 9 as shown in FIG. 3B (S111). The user manipulates the operation panel 6 to select a desired converted image (S112). The controller 5 reads out the selected converted image from the image memory 2, and puts into the image processor 8 to compress and convert the selected image. The controller 5 further stores the image data compressed in the image processor 8 into the memory card 11 by way of the card slot 10 (S113). Then the controller 5 erases the converted image data a to e from the image memory 2. Thus, the image data at the WB suited to the preference of the user can be obtained and easily stored in the memory card.

1.4 Summary of First Embodiment

As described herein, the digital camera of first embodiment of the invention includes the imaging section 1, image divider 3, WB correction value calculator 4, and WB corrector 7. The imaging section 1 images a subject to generate image data. The image divider 3 divides a whole region of the image data generated by the imaging section 1 into plural regions. Specifically, it is divided into four regions, that is, first to fourth regions. The image divider 3 further reads out the first data as a part of plural regions (for example, image data of any of first to fourth regions), and second data including at least the other part of the plural regions (for example, image data of the other region than the region read out as the first data). The WB correction value calculator 4 calculates a WB correction value (called "first WB correction value") corresponding to the first data based on the first data, and calculates the WB correction value (called "second WB correction value") corresponding to the second data based on the second data. The WB corrector 7 converts the image data generated in the imaging section 1 based on the first WB correction value to generate the first converted image data (any of converted image data A to E), and converts the image data generated in the imaging section based on the second WB correction value to generate the second converted image data (any of converted image data A to E except for the first converted image data).

In this configuration, the digital camera of the first embodiment generates converted image data corresponding to each WB correction value based on plural WB correction values, and thus an image suited to the preference of the user can be obtained. The captured image data as the origin of each converted image data is the same one, and therefore the layout of the image prevented from being contrary to the preference of the user in spite of user's correction of desired white balance.

The WB correction value calculator 4 calculates the WB correction value E based on the whole region of the image generated in the imaging section 1, and the WB corrector 7 converts the image data generated in the imaging section 1 based on this WB correction value E to generate the converted image data E. Hence the WB correction reflecting the whole image data is added to the candidates of final WB correction, and final WB correction is prevented from becoming largely different from the desire of the user.

The digital camera in first embodiment of the invention further includes the operation panel 6 for selecting either one for the first converted image or the second converted image. It also includes the controller 5 for controlling so as to store the converted image data selected by the operation panel or compressed data of the converted image into the storage medium. Hence, the user can manipulate easily for selecting the image. Only the converted image needed by the user can be stored in the memory card 11, and thus waste of storage capacity of memory card 11 can be prevented.

The converting method of image data of the invention includes a first step of generating image data by imaging a subject, a second step of dividing the whole region of the image data generated at the first step into plural regions (specifically four regions), a third step of reading out first data as a part of the plural regions, a fourth step of reading out second data including at least the other portion of the plural regions, a fifth step of calculating a WB correction value corresponding to the first data based on the first data, a sixth step of calculating a WB correction value corresponding to the second data based on the second data, a seventh step of generating first converted image data by converting the image data generated at the first step based on the WB correction value corresponding to the first data, and an eighth step of generating second converted image data by converting the image data generated at the first step based on the WB correction value corresponding to the second data.

In the embodiment, the WB correction value E is calculated based on the whole image, and the converted image data E generated based on the WB correction value E, but generation of converted image E is not always required. That is, only converted image A to D may be generated according to the WB correction values A to D based on the image data of each region, and desired converted image data can be selected from them by the user.

In the embodiment, the WB correction value is calculated in all regions of the image data, but not limited to this example, the WB correction value may be calculated in a part of regions of image data. That is, it is enough that plural WB correction values are obtained. For example, only in the second region and third region, WB correction values B and C may be calculated. Since WB correction value is not calculated in the other regions, the processing time of WB correction can be shortened.

In the embodiment, the image divider 3 reads out image data from the image memory 2, but the image data can be directly read out from the imaging section 1.

In the embodiment, the converted image desired by the user, out of a plurality of the converted images, is stored in the memory card 11, but all converted image data A to E can be stored in the memory card 11 without user's selection. Thus, the user can select and obtain desired image data somewhat later after an operation of imaging data.

Second Embodiment 2.1 Outline of Digital Camera in Second Embodiment

In the first embodiment of the invention, the WB corrector 7 corrects the WB of the image data stored in the image memory 2 using the WB correction value calculated by the WB correction value calculator 4 without change.

By contrast, in the second embodiment of the invention, the controller 5 either selects some WB correction values from the WB correction values calculated by the WB correction value calculator 4, or calculates a new WB correction value based on the WB correction values calculated by the WB correction value calculator 4, and then sets the value thus acquired as the WB correction value to be used in actual WB correction process. The WB corrector 7 corrects the WB of the image data stored in the image memory 2 using the WB correction value thus set by the controller 5. That is, in the second embodiment of the invention, the value calculated by the WB correction value calculator 4 is handled as a basic value (hereinafter called "white balance (WB) correction basic value") for setting the WB correction value in the controller 5.

Thus, improper values may be discarded among all the values calculated by the WB correction value calculator 4, and it is not required to generate converted image data in each of the values calculated by the WB correction value calculator 4. Hence the number of converted images generated can be reduced while optimizing white balance of the image data.

2.2 Configuration of Digital Camera in Second Embodiment

Figure 4:
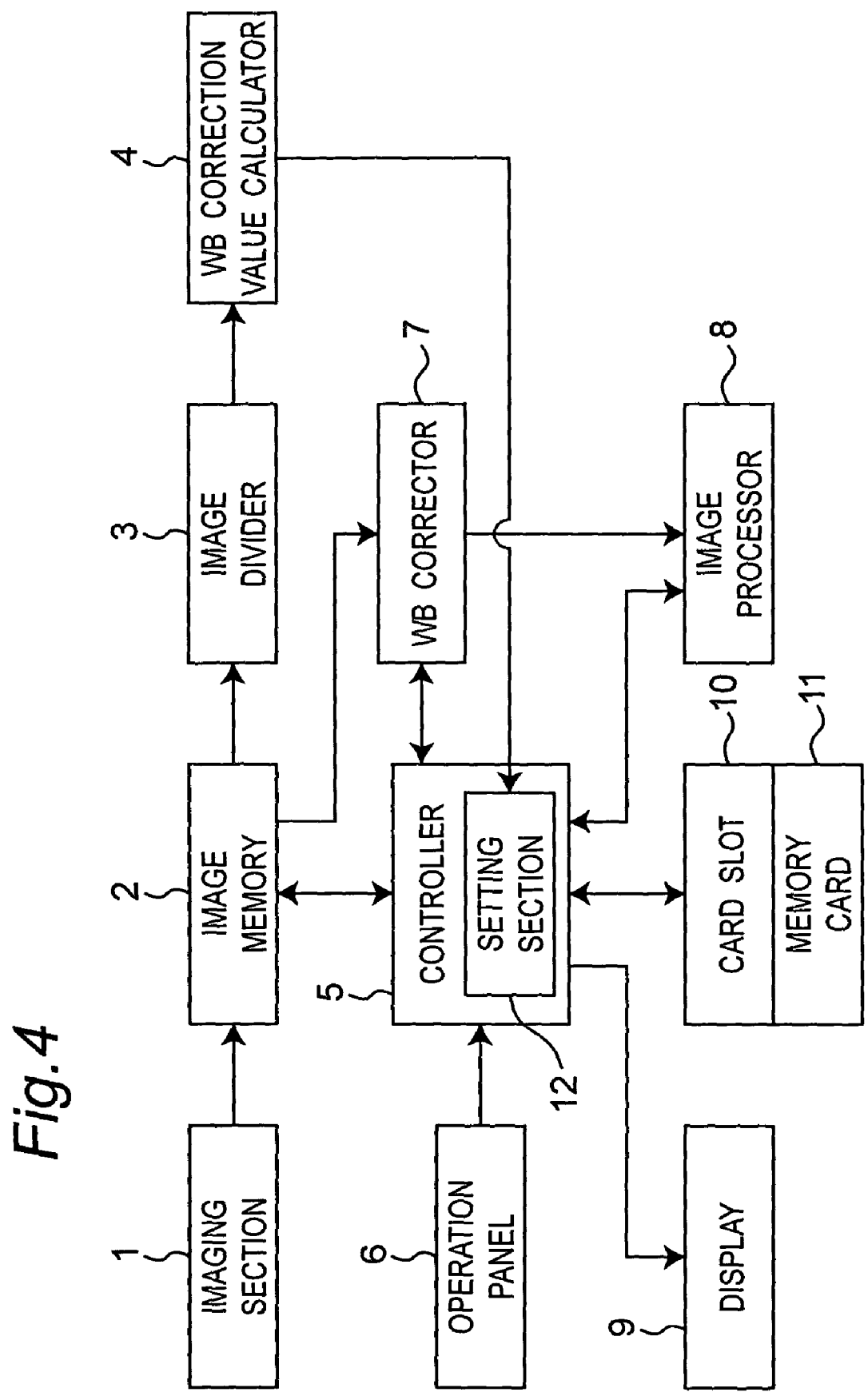
FIG. 4 is a block diagram of configuration of the digital camera in the second embodiment of the invention.

FIG. 4 shows a configuration of digital camera in second embodiment of the invention. The digital camera in second embodiment differs from the digital camera in first embodiment lies in that a setting section is provided in the controller 5.

The setting section 12 is means for setting the WB correction value based on the WB correction basic value calculated by the WB correction value calculator 4. Examples of setting method of WB correction value by the setting section 12 are explained below. Herein, the WB correction value calculator 4 calculates WB correction basic value A based on image data of the first region out of the image data shown in FIG. 1, calculates WB correction basic value B based on image data of the second region, calculates WB correction basic value C based on image data of the third region, calculates WB correction basic value D based on image data of the fourth region, and calculates WB correction basic value E based on whole image data. These values are specifically supposed to be "+3.5," "−1.0," "0," "−1.5," and "+0.2," respectively, as shown in FIG. 5A.

(1) First Example

Out of the WB correction basic values A to E calculated by the WB correction value calculator 4, the WB correction basic value of the median value and the WB correction basic values before and after it are selected as WB correction values to be used actually. For example, when WB correction basic values A to E are values as shown in FIG. 5A, first, that is, WB correction basic value C (specific value is "0") to be the median value is selected, and WB correction basic values E and B (specific values are "+0.2" to "−1.0") before and after it are selected. Thus, the set values shown in FIG. 5B are selected as WB correction values.

In this manner, by selecting only, without calculating a new correction value, the program for operating the setting section 12 can be created easily.

(2) Second Example

WB correction basic value E calculated based on whole image data is first selected as one WB correction value, and among the remaining WB correction basic values A to D, two values closer to the WB correction basic value E are selected as other WB correction values (specifically, WB correction basic values C and B). Thus, the WB correction values shown in FIG. 5C can be selected. By always including the WB correction basic value E, the WB correction reflecting the whole image can be achieved. Hence, generation of converted image data of which white balance is not largely different from the desire of the user can be prevented. In this example, the number of WB correction values is three, but the number is not limited to this.

(3) Third Example

A new WB correction value is calculated based on the average, dispersion or other static values of WB correction basic values A to E.

(4) Fourth Example

Groups relating to WB correction basic values are set in a specified range, and WB correction basic values A to E are divided into groups, and the representative value of each group is set as WB correction value. A grouping example is shown in FIG. 5D. For example, group F is a range of −5.0 or more and below −3.0 with the representative value of −4.0, and group G is a range of −3.0 or more and below −1.0 with the representative value of −2.0. According to this grouping, WB correction basic value A belongs to group K, WB correction basic values B, C and E belong to group H, and WB correction basic value D belongs to group G. Therefore, the WB correction values are representative values of these groups K, H, G, that is, "+4.0," "0," "−2.0".

By thus grouping the WB correction basic values, even if there are plural similar WB correction basic values, these WB correction basic values are narrowed down to one representative value, and generation of multiple converted image data with similar WB values can be prevented.

2.3 Operation of Digital Camera in Second Embodiment

Operation of digital camera in second embodiment is explained by referring to FIG. 6. In FIG. 6, two points are different from FIG. 3A showing the flowchart of first embodiment of the invention in.

The first point is that the value calculated by the WB correction value calculator 4 is used not as the WB correction value, but as the WB correction basic value, at step S114 and step S115. This is just a matter of naming of the value calculated by the WB correction value calculator 4, and is not an essential matter.

The second point is that step S116 is inserted between step S115 and step S107. That is, the setting section 12 either selects plural WB correction basic values from WB correction basic values A to E calculated at step S114 and step S115, or newly calculates WB correction value based on WB correction basic values a to E calculated at step S114 and step S115, and then sets the value thus acquired as WB correction value to be used in actual WB process (S116). The WB corrector 7 corrects the WB of image data stored in the image memory 2 by using the WB correction value set by the controller 5 (S107).

2.4 Summary of Second Embodiment

As described herein, the digital camera of second embodiment of the invention includes the imaging section 1, image divider 3, WB correction value calculator 4, setting section 12, and WB corrector 7. The WB correction value calculator 4 calculates the WB correction values used in WB correction of image data of each region, in a part or all of divided plural regions, as WB correction basic values. The setting section 12 sets the first WB correction value based on part of plural calculated WB correction basic values A to E, and sets the second WB correction value based on one or plural WB correction basic values A to E including at least other WB correction basic values A to E. More specifically, the setting section 12 either selects plural WB correction basic values from WB correction basic values A to E, or newly calculates WB correction value based on WB correction basic values A to E, and then sets it as WB correction value.

According to this configuration, before selection of the converted image by the user, the set value can be preliminarily narrowed down to proper values, and thus generation of many undesired converted images can be prevented.

In first and second embodiments, white balance is corrected on the image data generated by the imaging section 1, but not limited to white balance correction, the invention can be applied, for example, in correction of luminance. That is, for example, a whole region of the image data is divided into plural regions, the luminance correction value is determined in each region of the image data, and the luminance of image data is corrected based on the determined luminance correction value.

INDUSTRIAL APPLICABILITY

The imaging apparatus and the conversion method of image data according to the invention can be applied to any electronic appliances having functions of taking a still image or a moving picture and correcting white balance of the image data. For example, the invention can be applied to, in addition to a digital still camera, a digital video camera, an analog camera, a cellular phone with a camera, a PHS terminal with a camera, a PDA terminal with a camera, a car navigation system terminal with a camera, and the other electronic appliances.

Although the present invention has been described in connection with specified embodiments thereof, many other modifications, corrections and applications are apparent to those skilled in the art. Therefore, the present invention is not limited by the disclosure provided herein but limited only to the scope of the appended claims. The present disclosure relates to subject matter contained in Japanese Patent Application No. 2004-074257, filed on Mar. 16, 2004, which is expressly incorporated herein by reference in its entirety.

What is claimed is:

1. An imaging apparatus comprising:
    an imaging section operable to image a subject to generate an image of the subject;
    an image divider operable to divide the image of the subject generated by the imaging section into a plurality of divided regions, and to output data associated with each respective divided region of the plurality of divided regions;
    a calculator operable to calculate a plurality of set values, each set value being associated with a respectively different divided region of the image and calculated based on the outputted data associated with the respective divided region; and
    an image converter operable to generate a plurality of converted images, each of the converted images being obtained by converting the image of the subject based on a different one of the calculated set values, wherein each of the converted images is generated based on a characteristic of a partial image which is included in more than one divided region.

2. The imaging apparatus according to claim 1, wherein the calculated set values are values used for correcting white balance of the image, and the image converter corrects the white balance of the image generated by the imaging section based on the calculated set values to generate the plurality of converted images, respectively.

3. The imaging apparatus of any one of claim 1 further comprising an image selector operable to select one of generated plurality of converted images.

4. The imaging apparatus of claim 3, further comprising a controller operable to conduct a control to store the selected one of the converted images selected by the image selector or compressed data of the selected one of the converted images in a recording medium.

5. An imaging apparatus comprising:
an imaging section operable to image a subject to generate an image of the subject;
an image divider operable to divide the image of the subject generated by the imaging section into a plurality of divided regions, and to output data associated with each respective divided region of the plurality of divided regions;
a calculator operable to calculate a plurality of set values, each set value being associated with a respectively different divided region of the image and calculated based on the outputted data associated with the respective divided region and to calculate a further set value based on an entirety of the image generated by the imaging section; and
an image converter operable to generate a plurality of converted images, each of the converted images being obtained by converting the image of the subject based on a different one of the calculated set values associated with one of the divided regions and to generate a further converted image associated with the entirety of the image, the further converted image being obtained by converting the image based on the further set value,
wherein each of the converted images is generated based on a characteristic of a partial image which is included in more than one divided region.

6. The imaging apparatus according to claim 5, wherein the further set value is a set value used for correcting white balance of the image, and the image converter corrects white balance of the image generated by the imaging section based on the further set value to generate the further converted image.

7. An imaging apparatus comprising:
an imaging section operable to image a subject to generate an image of the subject;
an image divider operable to divide the image of the subject generated by the imaging section into a plurality of divided regions, and to output data associated with each respective divided region of the plurality of divided regions and further to output data associated with an entirety of the image of the subject;
a calculator operable to calculate first and second set values associated with respective ones of the divided regions, the calculated set values for the respective ones of the divided regions being based on the outputted data associated with the respective ones of the divided regions and to calculate a further set value associated with the entirety of the image generated by the imaging section based on the further outputted data; and
an image converter operable to generate first, second and further converted images, the first, second and further converted images being obtained by converting the image of the subject based on the first, second and further set values,
wherein each of the converted images is generated based on a characteristic of a partial image which is included in more than one divided region.

8. The image apparatus according to claim 7, wherein the first, second or further set value is a set value used for correcting white balance of the image, and the image converter corrects white balance of the image generated by the image section based on the first, second and further converted images, respectively.

9. An imaging apparatus comprising:
an imaging section operable to image a subject to generate image data;
an image divider operable to divide a whole region of the image generated by the imaging section into plural regions, and output data in each of the divided regions;
a calculator operable to calculate, as a set basic value, a set value used for converting the image data in each divided region, for all or a part of the divided regions;
a setting section operable to set a first set value based on at least one of the calculated set basic values, and set a second set value based on at least one of other calculated set basic values, and
an image converter operable to convert the whole of the image data generated by the imaging section based on the first set value to generate a first converted image, and convert the whole of the image data generated by the imaging section based on the second set value to generate a second converted image,
wherein each of the first and second converted images is generated based on a characteristic of a partial image which is included in more than one divided region.

10. The imaging apparatus according to claim 9, wherein the first or second set value is a set value used for correcting white balance of the image, and the image converter corrects white balance of the image generated by the imaging section based on the first and second set values to generate the first and second converted images, respectively.

11. The imaging apparatus of claim 9 further comprising an image selector operable to select one of generated converted images.

12. The imaging apparatus of claim 11, further comprising a controller operable to conduct control to store the converted image selected by the image selector or compressed data of the selected image in a recording medium.

13. An image data conversion method comprising:
imaging a subject to generate an image;
dividing the generated image into a plurality of divided regions;
outputting first data including data in at least one of the divided regions and second data including data in at least one other divided region;
calculating a first set value based on the first data;
calculating a second set value based on the second data;
converting the generated image based on the first set value to generate a first converted image, and
converting the generated image based on the second set value to generate a second converted image,
wherein each of the first and second converted images is generated based on a characteristic of a partial image which is included in more than one divided region.

14. An image data conversion method comprising:
imaging a subject to generate an image;
dividing the generated image into a plurality of regions to output first data including data in at least one of the divided regions;
calculating a first set value based on the first data;
calculating a second set value based on an entirety of the generated image;
converting the generated image based on the first set value to generate a first converted image; and converting the image generated data based on the second set value to generate a second converted image, wherein each of the first and second converted images is generated based on a characteristic of a partial image which is included in more than one divided region.

15. An image data conversion method comprising:

imaging a subject to generate an image;

dividing the generated image into a plurality of regions;

calculating, as a white balance correction basic value, a white balance correction value used for correcting white balance of the image from a respective divided region, for all or a part of the divided regions;

setting a first white balance correction value based on at least one of the calculated white balance correction basic values, and set a second white balance correction value based on at least one other calculated white balance correction basic values;

correcting white balance of an entirety of the generated image based on the first white balance correction value to generate a first converted image; and correcting white balance of the entirety of the generated image based on the second white balance correction value to generate a second converted image, wherein each of the first and second converted images is generated based on a characteristic of a partial image which is included in more than one divided region.

16. An imaging apparatus comprising:

an imaging section operable to image a subject to generate an image of the subject;

an image divider operable to divide an entire image of the subject generated by the imaging section into a plurality of divided regions, and to output data associated with each respective divided region of the plurality of divided regions;

a calculator operable to calculate a plurality of set values, each of the calculated set values being associated with a respectively different divided region of the entire image and calculated based on the outputted data associated with the respective divided region; and an image converter operable to generate a plurality of converted entire images of the subject, each of the converted entire images being obtained by converting the entire image generated by the imaging section, wherein each of the plurality of converted entire images is obtained by converting the entire image based on a respectively different calculated set value being associated with a respectively different divided region of the entire image.

* * * * *